US012624750B2

(12) United States Patent
Zhu et al.

(10) Patent No.: US 12,624,750 B2
(45) Date of Patent: May 12, 2026

(54) GEAR REDUCER WITH BALANCED OUTPUT OF VERY LARGE TORQUE FROM PLURALITY OF MOTORS

(71) Applicants: Jiangsu Guomao Reducer Co. Ltd., Changzhou (CN); China University Of Mining And Technology, Xuzhou (CN)

(72) Inventors: Zhencai Zhu, Changzhou (CN); Hu Hu, Changzhou (CN); Guohua Cao, Changzhou (CN); Zhisheng Tang, Changzhou (CN); Wenbo Ma, Changzhou (CN); Weiwei Li, Changzhou (CN)

(73) Assignees: JIANGSU GUOMAO REDUCER CO. LTD., Changzhou (CN); CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 18/922,730

(22) Filed: Oct. 22, 2024

(65) Prior Publication Data

US 2025/0237294 A1      Jul. 24, 2025

Related U.S. Application Data

(63) Continuation-in-part of application No. PCT/CN2024/079216, filed on Feb. 29, 2024.

(30) Foreign Application Priority Data

Jan. 19, 2024      (CN) .......................... 202410077774.8

(51) Int. Cl.
*F16H 37/06*          (2006.01)
*F16H 1/22*           (2006.01)

(52) U.S. Cl.
CPC ............. *F16H 37/065* (2013.01); *F16H 1/22* (2013.01)

(58) Field of Classification Search
CPC ................................. F16H 37/065; F16H 1/22
(Continued)

(56) References Cited

U.S. PATENT DOCUMENTS

| | | | | |
|---|---|---|---|---|
| 3,722,776 A | * | 3/1973 | Noe .......................... | B21D 1/05 226/195 |
| 4,811,627 A | * | 3/1989 | Mouille ................... | B64C 27/14 475/6 |
| 4,895,052 A | * | 1/1990 | Gleasman ........... | F16H 37/0806 180/6.44 |
| 5,040,429 A | * | 8/1991 | Del Castillo ............ | B25J 9/126 74/665 M |

(Continued)

FOREIGN PATENT DOCUMENTS

| | | |
|---|---|---|
| CN | 1743698 A | 3/2006 |
| CN | 202971760 U | 6/2013 |

(Continued)

OTHER PUBLICATIONS

CNIPA; International Search Report from Application No. PCT/CN2024/079216; mailed Jun. 7, 2024; In Chinese with English Translation (8 pages).

*Primary Examiner* — Jake Cook

(74) *Attorney, Agent, or Firm* — Fitch, Even, Tabin & Flannery LLP

(57)          ABSTRACT

The present invention relates to the field of hoisting drive systems for power shovels, and particularly to a reducer with balanced output of a very large torque from a plurality of motors, including a first motor shaft, a second motor shaft, a third motor shaft and a fourth motor shaft, which are each drivingly connected to the plurality of motors. In addition to outputting a very large torque employing the plurality of motors with the reducer, the reducer of the present invention can ensure that the output is balanced and stable, remarkably enhancing performance, safety and stability of a hoisting drive system for a power shovel. Adjustable motor trans- (Continued)

mission assemblies assembled on exterior lateral surfaces of the first motor shaft, the second motor shaft, the third motor shaft and the fourth motor shaft can adjust the number and locations of power transmission grooves according to the number and locations of actually active motors, greatly increasing applicability. Such adjustments are accomplished by a compact and sensible internal layout and design, without affecting external power transmission or heat dissipation spaces.

8 Claims, 3 Drawing Sheets

(58) Field of Classification Search
     USPC .......................................................... 74/661
     See application file for complete search history.

(56)                     References Cited

U.S. PATENT DOCUMENTS

| | | | |
|---|---|---|---|
| 5,178,028 A * | 1/1993 | Bossler, Jr. ............ | B64D 35/04 |
| | | | 74/665 GC |
| 7,220,203 B2 | 5/2007 | Holmes | |
| 2005/0028627 A1 * | 2/2005 | Fleytman .................. | F16H 1/16 |
| | | | 74/416 |

FOREIGN PATENT DOCUMENTS

| | | |
|---|---|---|
| CN | 110822065 A | 2/2020 |
| CN | 117570167 A | 2/2024 |
| KR | 20210028033 A | 3/2021 |

* cited by examiner

GEAR REDUCER WITH BALANCED OUTPUT OF VERY LARGE TORQUE FROM PLURALITY OF MOTORS

RELATED APPLICATIONS

This application is a continuation-in-part (CIP) application claiming benefit of PCT/CN2024/079216 filed on Feb. 29, 2024, which claims priority to Chinese Patent Application No. 202410077774.8 filed on Jan. 19, 2024, the disclosures of which are incorporated herein in their entirety by reference.

FIELD OF THE INVENTION

The present invention relates to the technical field of hoisting drive systems for power shovels, and particularly to a reducer with balanced output of a very large torque from a plurality of motors.

DESCRIPTION OF THE PRIOR ART

As an important foundation of the national economy, the water conservancy and mining industries undertake the task of providing transportation, electricity, as well as coal and various mineral raw materials. Gate hoist and ship-lift systems are mainly used to provide transportation in hydroelectric dams. As these systems are required to hoist heavy weights, they must be powered by very large reducers. As one of the main heavy-duty equipment for open-cut mining, power shovels are primarily used in opencast mines to strip and remove overburden and extract and load minerals. Most power shovels employ reducers to actuate their buckets. Most very large hoists employ reducers to provide vertical transportation. Most very large scraper and belt conveyors employ reducers to provide horizontal conveyance.

Existing drive systems for power shovels are essentially composed of one or more electric motors, a reducer and a winch. As ship lifters, power shovels, hoists, scraper conveyors and the like handle very heavy weights including their own weights and loads' weights, reducers used in such equipment are required to provide a very large output torque. Most existing reducers achieve this by a design employing a dual-motor parallel input along with a two-stage fixed-axis gear transmission matching a single-shaft output reducer, or a single motor with a two-stage planetary gear reducer.

Although the design employing two-stage reduction with the dual-motor parallel input can provide a greater torque by combining power from both motors, this requires balanced output of the two motors when they are both in operation. Otherwise, unbalanced output of the motors will directly affect the output of the reducer and may eventually make it impossible to provide consistent hoisting. The design employing a single motor with two-stage planetary gear reducer provides an output torque which is limited to the output torque of the motor, and a larger output torque requires replacement with a more powerful motor.

As annual production of open-pit mines increases, stable and reliable operation of power shovels are more and more valued. For a power shovel, the stability of its hoisting system is crucial to its stable operation. The existing reducers used as hoisting drives in power shovels are all associated with a number of limitations and cannot adapt themselves to the number of actually active motors. Therefore, they are approaching the limit of their ability to meet the ever-growing demand from the production sector. Additionally, the existing reducers are not able to quickly remove debris from and lubricate tooth surfaces of the transmission gears in an automated manner during operation and thus tend to require high maintenance costs after a certain period of use.

SUMMARY OF THE INVENTION

The problem sought to be solved by the present invention is that the existing reducers used as hoisting drives in power shovels are all associated with a number of limitations and cannot adapt themselves to the number of actually active motors. Therefore, they are approaching the limit of their ability to meet the ever-growing demand from the production sector. Moreover, they are not able to quickly remove debris from and lubricate tooth surfaces of the transmission gears in an automated manner during operation and thus tend to require high maintenance costs after a certain period of use.

The above problem is solved by a reducer with balanced output of a very large torque from a plurality of motors proposed in the present invention, which includes a first motor shaft, a second motor shaft, a third motor shaft and a fourth motor shaft, which are each drivingly connected to the plurality of motors. An upper left vertically positioned transmission gear and a lower left vertically positioned transmission gear which are mutually driven are disposed in a top-down orientation each between the first motor shaft and the second motor shaft. An upper right vertically positioned transmission gear and a lower right vertically positioned transmission gear which are mutually driven are disposed in a top-down orientation each between the third motor shaft and the fourth motor shaft. The upper left vertically positioned transmission gear and the upper right vertically positioned transmission gear are drivingly connected to each other by a first horizontally positioned transmission shaft. The lower left vertically positioned transmission gear and the lower right vertically positioned transmission gear are drivingly connected to each other by a second horizontally positioned transmission shaft. Adjustable motor transmission assemblies are assembled on exterior lateral surfaces of the first motor shaft, the second motor shaft, the third motor shaft and the fourth motor shaft. Electronically controlled torque adjustment assemblies are axially mounted on right side walls of the upper left vertically positioned transmission gear, the lower left vertically positioned transmission gear, the upper right vertically positioned transmission gear and the lower right vertically positioned transmission gear.

Inwardly-projecting integral internal mounting rings are fixed at middle locations of inner circumferential surfaces of the first motor shaft, the second motor shaft, the third motor shaft and the fourth motor shaft, and vertical adjustment apertures in cooperation with the adjustable motor transmission assemblies are formed in the exterior lateral surfaces of the first motor shaft, the second motor shaft, the third motor shaft and the fourth motor shaft.

The adjustable motor transmission assemblies comprise first raisable and lowerable spacer rings movably sleeved at upper ends of outer circumferential surfaces of the first motor shaft, the second motor shaft, the third motor shaft and the fourth motor shaft, second raisable and lowerable spacer rings movably sleeved at lower ends the outer circumferential surfaces of the first motor shaft, the second motor shaft, the third motor shaft and the fourth motor shaft, first electronically controlled struts fixed to upper ends of the internal mounting rings, second electronically controlled struts fixedly mounted to lower ends of the internal mounting rings, first internal control rings axially fixed to bottoms of telescopic sections of the first electronically controlled struts, and second internal control rings axially fixed to tops of the telescopic sections of the second electronically controlled struts.

Horizontally positioned transmission links are provided between upper and lower ends of the first motor shaft and the electronically controlled torque adjustment assemblies on the upper left vertically positioned transmission gear and the lower left vertically positioned transmission gear, between upper and lower ends of the second motor shaft and the electronically controlled torque adjustment assemblies on the upper left vertically positioned transmission gear and the lower left vertically positioned transmission gear, between upper and lower ends of the third motor shaft and the electronically controlled torque adjustment assemblies on the upper right vertically positioned transmission gear and the lower right vertically positioned transmission gear, and between upper and lower ends of the fourth motor shaft and the electronically controlled torque adjustment assemblies on the upper right vertically positioned transmission gear and the lower right vertically positioned transmission gear.

The electronically controlled torque adjustment assemblies comprise first fixation holders and second fixation holders fixed on right side surfaces of the upper left vertically positioned transmission gear, the lower left vertically positioned transmission gear, the upper right vertically positioned transmission gear and the lower right vertically positioned transmission gear, first adjustment struts fixedly mounted to outer side surfaces of the first fixation holders, second adjustment struts fixedly mounted to the second fixation holders and toothed gear heads axially fixed to outer telescopic sections of the first adjustment struts and the second adjustment struts.

Internal control shafts drivingly connected to the horizontally positioned transmission links are fixedly assembled at cores of the first motor shaft, the second motor shaft, the third motor shaft and the fourth motor shaft by lateral supports.

Circular intermediate through-bores in cooperation with the horizontally positioned transmission links are formed at centers of the upper left vertically positioned transmission gear, the lower left vertically positioned transmission gear, the upper right vertically positioned transmission gear and the lower right vertically positioned transmission gear, and internal guide vanes are axially sleeved on exterior lateral surfaces of the horizontal power transmission links.

Oblique guide holes in communication with interiors of the circular intermediate through-bores are formed in inner walls of exterior gear tooth spaces of the upper left vertically positioned transmission gear, the lower left vertically positioned transmission gear, the upper right vertically positioned transmission gear and the lower right vertically positioned transmission gear.

Annular diffuser hubs are provided at openings of the circular intermediate through-bores on both sides thereof.

Annular transmission bevel gear frames are fixedly assembled to lower surfaces of the first internal control rings and upper surfaces of the second internal control rings, and central guide sleeves are fixed by internal supports to the first internal control rings and the second internal control rings.

The present invention offers the benefits as follows:

(1) In addition to outputting a very large torque employing the plurality of motors with the reducer, the reducer with balanced output of a very large torque from a plurality of motors of the present invention can ensure that the output is balanced and stable, remarkably enhancing performance, safety and stability of a hoisting drive system for a power shovel.

(2) The adjustable motor transmission assemblies assembled on the exterior lateral surfaces of the first motor shaft, the second motor shaft, the third motor shaft and the fourth motor shaft can adjust the number and locations of power transmission grooves according to the number and locations of actually active motors, greatly increasing applicability.

(3) Such adjustments are accomplished by a compact and sensible internal layout and design, without affecting external power transmission or heat dissipation spaces.

(4) The electronically controlled torque adjustment assemblies axially mounted on the right side walls of the upper left vertically positioned transmission gear, the lower left vertically positioned transmission gear, the upper right vertically positioned transmission gear and the lower right vertically positioned transmission gear allow sun bevel gears of different sizes to be used to address different needs requiring different torques. Moreover, torque adjustments are possible during use by engagement and disengagement.

(5) The circular intermediate through-bores at the centers of the upper left vertically positioned transmission gear, the lower left vertically positioned transmission gear, the upper right vertically positioned transmission gear and the lower right vertically positioned transmission gear in cooperation with the horizontal power transmission links facilitate arrangement of the horizontally positioned transmission links and additionally increase internal space utilization.

(6) The internal guide vanes axially sleeved on the exterior lateral surfaces of the horizontally positioned transmission links can produce centrifugal forces when rotating, which force air or a lubricant from the outside into the oblique guide holes to clean and lubricate gear tooth surfaces of the upper left vertically positioned transmission gear, the lower left vertically positioned transmission gear, the upper right vertically positioned transmission gear and the lower right vertically positioned transmission. This self-maintenance can improve stability and durability of the main transmission surfaces and quickly enhance heat dissipation.

BRIEF DESCRIPTION OF THE DRAWINGS

The present invention will be further described below with reference to the accompanying drawings, which illustrate embodiments thereof, and in which.

DETAILED DESCRIPTION OF THE PREFERRED EMBODIMENTS

The present invention will be described in greater detail below with reference to the accompanying drawings. These figures are all provided in a simplified and schematic form and only intended to illustrate a basic configuration of the invention. Therefore, they show only components related to the present invention.

It is to be noted that, as used herein, the terms "connecting" and "coupling" should be interpreted in a broad sense, unless otherwise expressly specified or defined. For example, a "connection" may be a permanent, detachable or integral connection. Alternatively, it may be a mechanical or electrical connection. Still alternatively, it may be a direct or indirect connection with one or more intervening media. Those of ordinary skill in the art can understand the specific meanings of the above-mentioned terms herein, depending on their context.

Figure 1:
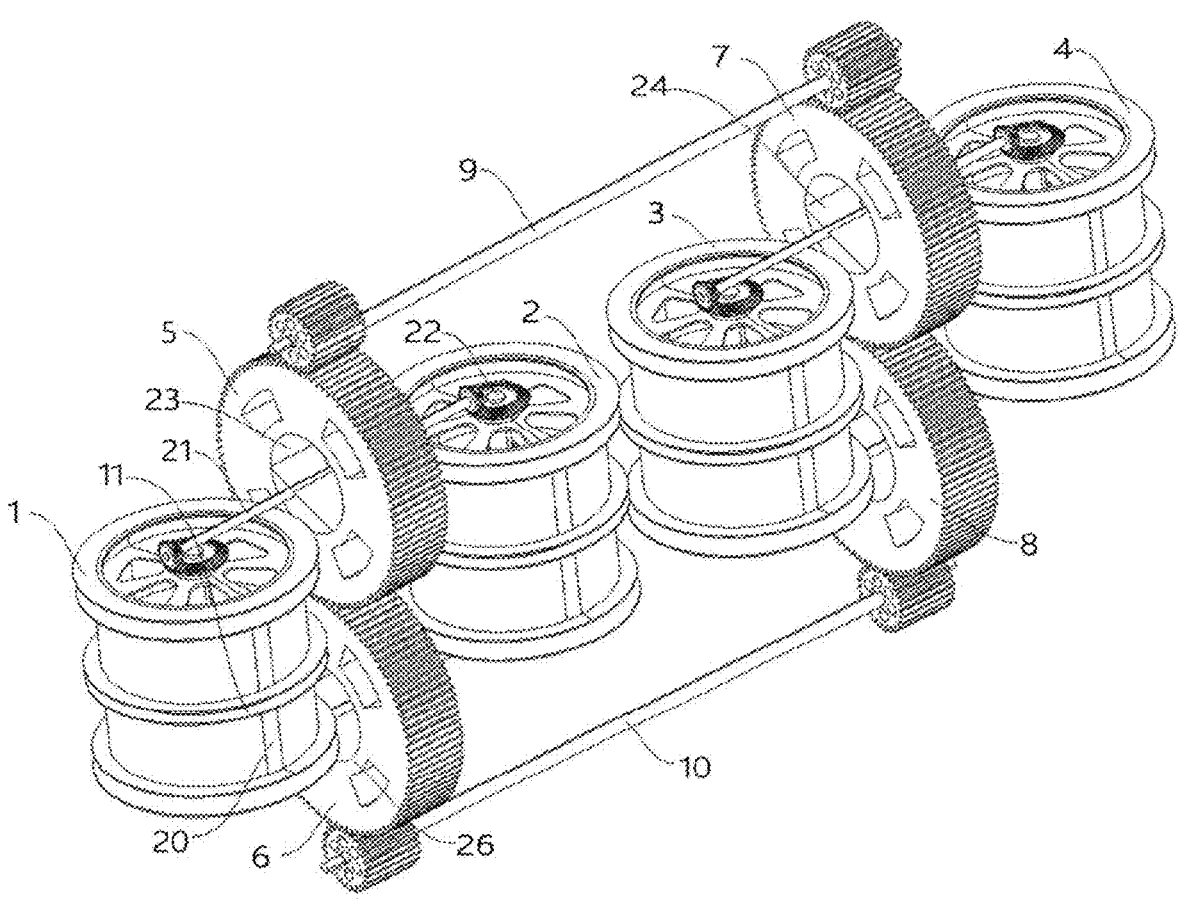
FIG. 1 is a schematic structural view of the present invention.
Figure 2:
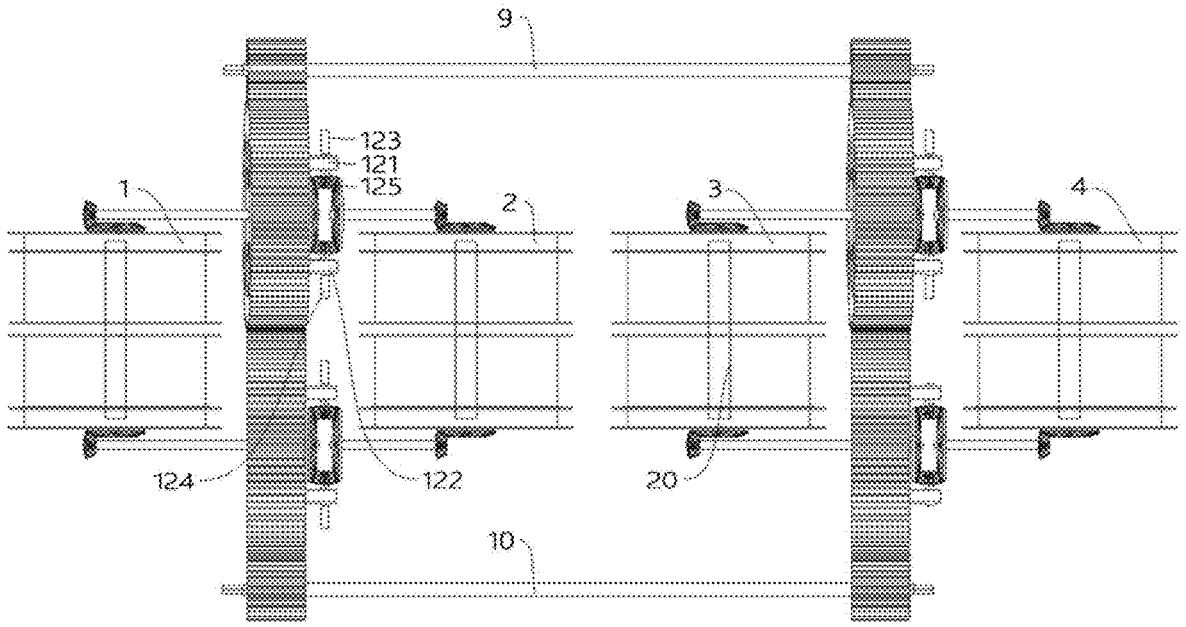
FIG. 2 is a front view of the present invention.
Figure 3:
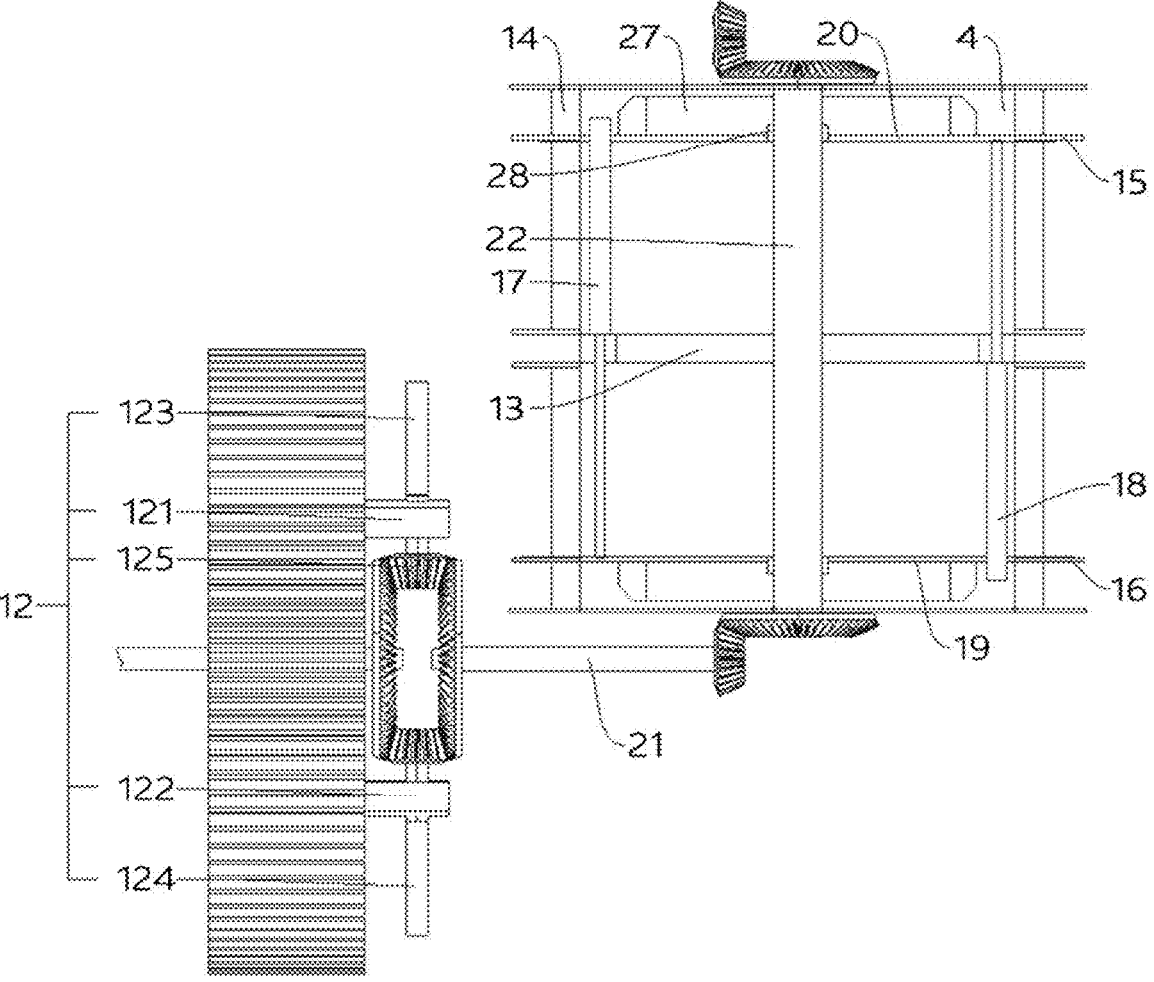
FIG. 3 is a schematic partial view showing the locations of an electronically controlled torque adjustment assembly according to the present invention.
Figure 4:
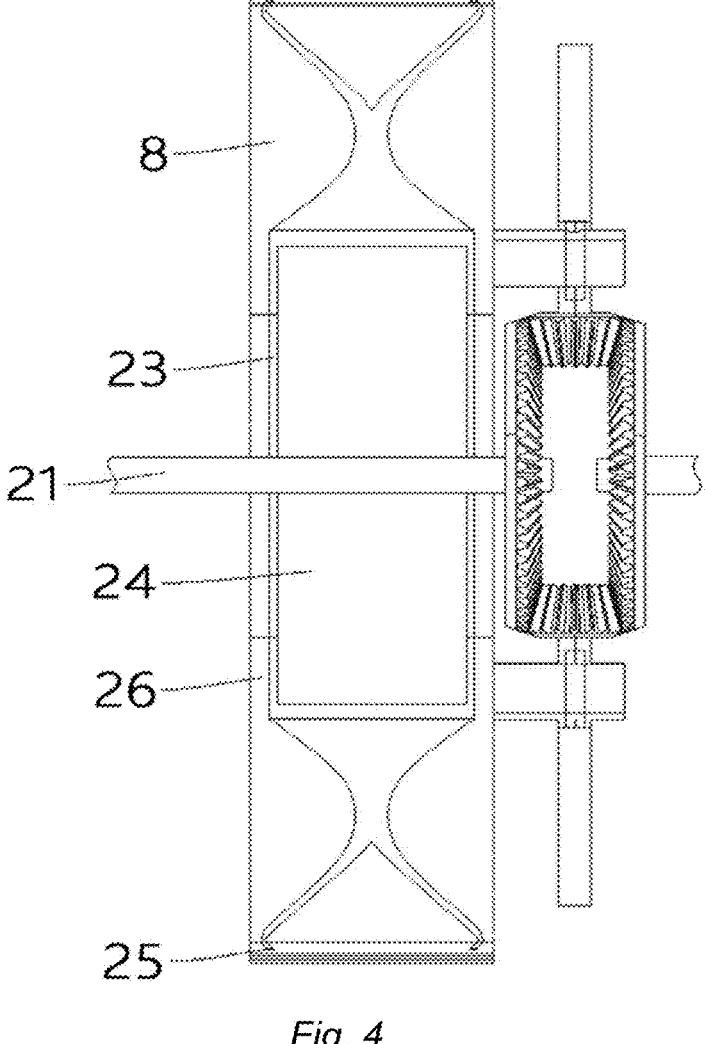
FIG. 4 is a schematic diagram showing the internal structure of a lower right vertically positioned transmission gear according to the present invention.

FIGS. 1, 2, 3 and 4 show a reducer with balanced output of a very large torque from a plurality of motors. The reducer includes a first motor shaft 1, a second motor shaft 2, a third motor shaft 3 and a fourth motor shaft 4, which are each drivingly connected to four motors. Between the first motor shaft 1 and the second motor shaft 2, an upper left vertically positioned transmission gear 5 and a lower left vertically positioned transmission gear 6 which are mutually driven are disposed in a top-down orientation. Between the third motor shaft 3 and the fourth motor shaft 4, an upper right vertically positioned transmission gear 7 and a lower right vertically positioned transmission gear 8 which are mutually driven are disposed in a top-down orientation. The upper left vertically positioned transmission gear 5 and the upper right vertically positioned transmission gear 7 are drivingly connected to each other by a first horizontally positioned transmission shaft 9. The lower left vertically positioned transmission gear 6 and the lower right vertically positioned transmission gear 8 are drivingly connected to each other by a second horizontally positioned transmission shaft 10. Adjustable motor transmission assemblies 11 are assembled on exterior lateral surfaces of the first motor shaft 1, the second motor shaft 2, the third motor shaft 3 and the fourth motor shaft 4. Electronically controlled torque adjustment assemblies 12 are axially mounted on right side walls of the upper left vertically positioned transmission gear 5, the lower left vertically positioned transmission gear 6, the upper right vertically positioned transmission gear 7 and the lower right vertically positioned transmission gear 8.

The first motor shaft 1, the second motor shaft 2, the third motor shaft 3 and the fourth motor shaft 4 are of the same structure. The upper left vertically positioned transmission gear 5, the lower left vertically positioned transmission gear 6, the upper right vertically positioned transmission gear 7 and the lower right vertically positioned transmission gear 8 are of the same structure.

In order to facilitate internal mounting and control, inwardly-projecting integral internal mounting rings 13 are fixed at the middle of inner circumferential surfaces of the first motor shaft 1, the second motor shaft 2, the third motor shaft 3 and the fourth motor shaft 4, and vertical adjustment apertures 14 in cooperation with the adjustable motor transmission assemblies 11 are formed in the exterior lateral surfaces of the first motor shaft 1, the second motor shaft 2, the third motor shaft 3 and the fourth motor shaft 4.

In order to facilitate adjusting the locations and number of active motors, the adjustable motor transmission assemblies 12 include first raisable and lowerable spacer rings 15 movably sleeved at the upper ends of outer circumferential surfaces of the first motor shaft 1, the second motor shaft 2, the third motor shaft 3 and the fourth motor shaft 4, second raisable and lowerable spacer rings 16 movably sleeved at the lower ends the outer circumferential surfaces of the first motor shaft 1, the second motor shaft 2, the third motor shaft

3 and the fourth motor shaft 4, first electronically controlled struts 17 fixed to upper ends of the internal mounting rings 13, second electronically controlled struts 18 fixedly mounted to lower ends of the internal mounting rings 13, first internal control rings 19 axially fixed to bottoms of telescopic sections of the first electronically controlled struts 17 and second internal control rings 20 axially fixed to tops of the telescopic sections of the second electronically controlled struts 18.

The first raisable and lowerable spacer rings 15 are fixedly connected to the second internal control rings 20, and the second raisable and lowerable spacer rings 16 are fixedly connected to the first internal control rings 19, by connecting supports within the vertical adjustment apertures 14.

The first electronically controlled struts 17 and the second electronically controlled struts 18 are both known in the art and fixed to the opposite ends of the internal mounting rings 13 into staggered ring-shaped arrays to provide more stable raising and lowering of the first raisable and lowerable spacer rings 15 and the second raisable and lowerable spacer rings 16.

The first electronically controlled struts 17 raise and lower the first internal control rings 19 and hence the second raisable and lowerable spacer rings 16. The second electronically controlled struts 18 raise and lower the second internal control rings 20 and hence the first raisable and lowerable spacer rings 15. The raising and lowering of the first raisable and lowerable spacer rings 15 and the second raisable and lowerable spacer rings 16 change the number and positions of grooves for assembly of conveyor belts on outer circumferential surfaces of the first motor shaft 1, the second motor shaft 2, the third motor shaft 3 and the fourth motor shaft 4. For example, lowering of the first raisable and lowerable spacer rings 15 and raising of the second raisable and lowerable spacer rings 16 may result in the appearance of three conveyor belt grooves on the outer circumferential surfaces of the first motor shaft 1, the second motor shaft 2, the third motor shaft 3 and the fourth motor shaft 4, which allows three motors to be drivingly connected to each motor shafts. Lowering of the first raisable and lowerable spacer rings 15 and raising of the second raisable and lowerable spacer rings 16 to middle locations may result in the appearance of two conveyor belt grooves on the outer circumferential surfaces of the first motor shaft 1, the second motor shaft 2, the third motor shaft 3 and the fourth motor shaft 4, which allows two motors to be drivingly connected to each motor shafts. Raising of the first raisable and lowerable spacer rings 15 and lowering of the second raisable and lowerable spacer rings 16 to outer edge locations may result in the appearance of one conveyor belt groove on the outer circumferential surfaces of the first motor shaft 1, the second motor shaft 2, the third motor shaft 3 and the fourth motor shaft 4, which allows one motor to be drivingly connected to each motor shafts.

In order to facilitate power transmission, horizontally positioned transmission links 21 are disposed between upper and lower ends of the first motor shaft 1 and the electronically controlled torque adjustment assemblies on the upper left vertically positioned transmission gear 5 and the lower left vertically positioned transmission gear 6, between upper and lower ends of the second motor shaft 2 and the electronically controlled torque adjustment assemblies on the upper left vertically positioned transmission gear 5 and the lower left vertically positioned transmission gear 6, between upper and lower ends of the third motor shaft 3 and the electronically controlled torque adjustment assemblies on the upper right vertically positioned transmission gear 7 and the lower right vertically positioned transmission gear 8, and between upper and lower ends of the fourth motor shaft 4 and the electronically controlled torque adjustment assemblies on the upper vertically positioned right transmission gear 7 and the lower right vertically positioned transmission gear 8.

In order to facilitate geared power transmission, the electronically controlled torque adjustment assemblies 12 include first fixation holders 121 and second fixation holders 122 fixed on right side surfaces of the upper left vertically positioned transmission gear 5, the lower left vertically positioned transmission gear 6, the upper right vertically positioned transmission gear 7 and the lower right vertically positioned transmission gear 8, first adjustment struts 123 fixedly mounted to outer side surfaces of the first fixation holders 121, second adjustment struts 124 fixedly mounted to the second fixation holders 122 and toothed gear heads 125 axially fixed to outer telescopic sections of the first adjustment struts 123 and the second adjustment struts 124.

The first adjustment struts 123 and the second adjustment struts 124 are both known in the art and configured to raise and lower the toothed gear heads 125 into and away from engagement with adjacent ends of the horizontally positioned transmission links 21 for geared power transmission. Rotation of the horizontally positioned transmission links 21 can drive rotation in synchronization therewith of the upper left vertically positioned transmission gear 5, the lower left vertically positioned transmission gear 6, the upper right vertically positioned transmission gear 7 and the lower right vertically positioned transmission gear 8. When the first adjustment struts 123 and the second adjustment struts 124 disengage the toothed gear heads 125 from the horizontally positioned transmission links 21, the upper left vertically positioned transmission gear 5, the lower left vertically positioned transmission gear 6, the upper right vertically positioned transmission gear 7 and the lower right vertically positioned transmission gear 8 will separate from the first motor shaft 1, the second motor shaft 2, the third motor shaft 3 and the fourth motor shaft 4 and lose power. Increasing the number of engagement of the toothed gear heads 125 and the horizontally positioned transmission links 21 can result in a larger torque. Using transmission gears of different sizes at the opposite ends of the horizontally positioned transmission links 21 can vary power transmission torques and speeds of rotation.

In order to facilitate internal power transmission control, internal control shafts 22 drivingly connected to the horizontally positioned transmission links are fixedly assembled at the cores of the first motor shaft 1, the second motor shaft 2, the third motor shaft 3 and the fourth motor shaft 4 by lateral supports.

The horizontally positioned transmission links 21 and the internal control shafts 22 are all provided with sun bevel gears at both ends.

In order to facilitate horizontal power transmission, circular intermediate through-bores 23 in cooperation with the horizontally positioned transmission links 21 are formed at centers of the upper left vertically positioned transmission gear 5, the lower left vertically positioned transmission gear 6, the upper right vertically positioned transmission gear 7 and the lower right vertically positioned transmission gear 8, and internal guide vanes 24 are axially sleeved on exterior lateral surfaces of the horizontally positioned transmission links 21.

In order to facilitate directing a fluid along the inner walls of the gear tooth spaces, oblique guide holes 25 in communication with the interiors of the circular intermediate through-bores 23 are formed in the inner walls of exterior gear tooth spaces of the upper left vertically positioned transmission gear 5, the lower left vertically positioned transmission gear 6, the upper right vertically positioned transmission gear 7 and the lower right vertically positioned transmission gear 8.

When the internal guide vanes 24 rotate, the fluid on both sides of the upper left vertically positioned transmission gear 5, the lower left vertically positioned transmission gear 6, the upper right vertically positioned transmission gear 7 and the lower right vertically positioned transmission gear 8, which may be a lubricant or air, will be drawn into the interiors of the circular intermediate through-bores 23 and then into the interiors of the oblique guide holes 25 from the interiors of the circular intermediate through-bores 23. Directed by the oblique guide holes 25, the fluid is then introduced onto the facing tooth surfaces to flush away foreign matter and heat therefrom. In case of a lubricant, it can additionally lubricate the surfaces. In this way, the tooth surfaces can be cleaned and lubricated during their meshing for geared power transmission.

In order to facilitate lateral guidance of the fluid, annular diffuser hubs 26 are arranged at openings of the circular intermediate through-bores 23 at both sides thereof.

This can narrow the openings of the circular intermediate through-bores 23 at both sides of the internal guide vanes 24, facilitating suction of the fluid into the circular intermediate through-bores 23 from its both sides as a result of rotation of the internal guide vanes 24.

In order to facilitate power transmission, annular power-transmission bevel gear frames 27 are fixedly assembled to lower surfaces of the first internal control rings 19 and upper surfaces of the second internal control rings 20, and central guide sleeves 28 are fixed by internal supports to the first internal control rings 19 and the second internal control rings 20.

When the first internal control rings 19 are lowered by the first electronically controlled struts 17 to the lowermost positions, the annular power-transmission bevel gear frames 27 fixed to the lower surfaces of the first internal control rings 19 emerge out of openings in the lower ends of the first motor shaft 1, the second motor shaft 2, the third motor shaft 3 and the fourth motor shaft 4. When the second internal control rings 20 are raised by the second electronically controlled struts 18 to the uppermost positions, the annular power-transmission bevel gear frames 27 fixed to the upper surfaces of the second internal control rings 20 emerge out of openings in the upper ends of the first motor shaft 1, the second motor shaft 2, the third motor shaft 3 and the fourth motor shaft 4. When either of these occurs, the first motor shaft 1, the second motor shaft 2, the third motor shaft 3 and the fourth motor shaft 4 can be drivingly connected to the motors by gear shafts, enhancing power transmission.

In the foregoing description, preferred embodiments of the present invention have been described. Those skilled in the art can make many modifications and variations in light of the above teachings, without departing from the spirit of the invention. Accordingly, such description is not intended to limit the scope of the invention as defined by the following claims.

The invention claimed is:

1. A reducer, comprising a first motor shaft, a second motor shaft, a third motor shaft and a fourth motor shaft, each configured to be drivingly connected to a motor, wherein an upper left vertically positioned transmission gear and a lower left vertically positioned transmission gear which are mutually driven are disposed in a top-down orientation each between the first motor shaft and the second motor shaft, an upper right vertically positioned transmission gear and a lower right vertically positioned transmission gear mutually driven are disposed in a top-down orientation each between the third motor shaft and the fourth motor shaft (4), the upper left vertically positioned transmission gear and the upper right vertically positioned transmission gear are drivingly connected by a first horizontally positioned transmission shaft, and the lower left vertically positioned transmission gear and the lower right vertically positioned transmission gear are drivingly connected by a second horizontally positioned transmission shaft, adjustable motor transmission assemblies are assembled on exterior lateral surfaces of the first motor shaft, the second motor shaft, the third motor shaft and the fourth motor shaft, and torque adjustment assemblies are axially mounted on right side walls of the upper left vertically positioned transmission gear, the lower left vertically positioned transmission gear, the upper right vertically positioned transmission gear and the lower right vertically positioned transmission gear;

wherein horizontally positioned transmission links are provided between upper and lower ends of the first motor shaft and the torque adjustment assemblies on the upper left vertically positioned transmission gear and the lower left vertically positioned transmission gear, between upper and lower ends of the second motor shaft and the torque adjustment assemblies on the upper left vertically positioned transmission gear and the lower left vertically positioned transmission gear, between upper and lower ends of the third motor shaft and the torque adjustment assemblies on the upper right vertically positioned transmission gear and the lower right vertically positioned transmission gear, and between upper and lower ends of the fourth motor shaft and the torque adjustment assemblies on the upper right vertically positioned transmission gear and the lower right vertically positioned transmission gear;

wherein the torque adjustment assemblies comprise first fixation holders and second fixation holders fixed on right side surfaces of the upper left vertically positioned transmission gear, the lower left vertically positioned transmission gear, the upper right vertically positioned transmission gear and the lower right vertically positioned transmission gear, first adjustment struts fixedly mounted to outer side surfaces of the first fixation holders, second adjustment struts fixedly mounted to the second fixation holders and toothed gear heads axially fixed to outer telescopic sections of the first adjustment struts and the second adjustment struts;

wherein: when the toothed gear heads of the first adjustment struts and the toothed gear heads of the second adjustment struts engage with the horizontally positioned transmission links, the upper left vertically positioned transmission gear, the lower left vertically positioned transmission gear, the upper right vertically positioned transmission gear and the lower right vertically positioned transmission gear are driven to rotate through a rotation of the horizontally positioned transmission links, and when the toothed gear heads of the first adjustment struts and the toothed gear heads of the second adjustment struts are disengaged from the horizontally positioned transmission links, the upper left vertically positioned transmission gear, the lower left vertically positioned transmission gear, the upper right vertically positioned transmission gear and the lower right vertically positioned transmission gear separate from the first motor shaft, the second motor shaft, the third motor shaft and the fourth motor shaft.

2. The reducer according to claim 1, wherein inwardly-projecting integral internal mounting rings are fixed at middle locations of inner circumferential surfaces of the first motor shaft, the second motor shaft, the third motor shaft and the fourth motor shaft, and that vertically positioned adjustment apertures in cooperation with the adjustable motor transmission assemblies are formed in the exterior lateral surfaces of the first motor shaft, the second motor shaft, the third motor shaft and the fourth motor shaft.

3. The reducer according to claim 2, wherein the adjustable motor transmission assemblies comprise first raisable and lowerable spacer rings movably sleeved at upper ends of outer circumferential surfaces of the first motor shaft, the second motor shaft, the third motor shaft and the fourth motor shaft, second raisable and lowerable spacer rings movably sleeved at lower ends of the outer circumferential surfaces of the first motor shaft, the second motor shaft, the third motor shaft and the fourth motor shaft, first electronically controlled struts fixed to upper ends of the internal mounting rings, second electronically controlled struts fixedly mounted to lower ends of the internal mounting rings, first internal control rings axially fixed to bottoms of telescopic sections of the first electronically controlled struts, and second internal control rings axially fixed to tops of the telescopic sections of the second electronically controlled struts.

4. The reducer according to claim 1, wherein internal control shafts drivingly connected to the horizontally positioned transmission links are fixedly assembled at cores of the first motor shaft, the second motor shaft, the third motor shaft and the fourth motor shaft by lateral supports.

5. The reducer according to claim 1, wherein circular intermediate through-bores in cooperation with the horizontally positioned transmission links are formed at centers of the upper left vertically positioned transmission gear, the lower left vertically positioned transmission gear, the upper right vertically positioned transmission gear and the lower right vertically positioned transmission gear, and that internal guide vanes are axially sleeved on exterior lateral surfaces of the horizontally positioned transmission links.

6. The reducer according to claim 5, wherein oblique guide holes in communication with interiors of the circular intermediate through-bores are formed in inner walls of exterior gear teeth spaces of the upper left vertically positioned transmission gear, the lower left vertically positioned transmission gear, the upper right vertically positioned transmission gear and the lower right vertically positioned transmission gear.

7. The reducer according to claim 5, wherein annular diffuser hubs are provided at openings of the circular intermediate through-bores on both sides thereof.

8. The reducer according to claim 3, wherein annular transmission bevel gear frames are fixedly assembled to lower surfaces of the first internal control rings and upper surfaces of the second internal control rings, and central guide sleeves are fixed by internal supports to the first internal control rings and the second internal control rings.

* * * * *